(12) United States Patent
Takigawa

(10) Patent No.: US 11,994,728 B2
(45) Date of Patent: May 28, 2024

(54) JUNCTION DEVICE, AND UNDERSEA CABLE SYSTEM

(71) Applicant: NEC Corporation, Tokyo (JP)

(72) Inventor: Yoshinari Takigawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 316 days.

(21) Appl. No.: 17/618,610

(22) PCT Filed: Jun. 4, 2020

(86) PCT No.: PCT/JP2020/022172
§ 371 (c)(1),
(2) Date: Dec. 13, 2021

(87) PCT Pub. No.: WO2020/261924
PCT Pub. Date: Dec. 30, 2020

(65) Prior Publication Data
US 2022/0260797 A1    Aug. 18, 2022

(30) Foreign Application Priority Data
Jun. 24, 2019   (JP) .................................. 2019-116239

(51) Int. Cl.
G02B 6/44     (2006.01)
H01B 7/14     (2006.01)
H04B 10/03    (2013.01)

(52) U.S. Cl.
CPC ............. *G02B 6/4427* (2013.01); *H01B 7/14* (2013.01); *H04B 10/03* (2013.01)

(58) Field of Classification Search
CPC ........ G02B 6/4427; H01B 7/14; H04B 10/03; H04B 10/038; H04J 14/0289; H04J 14/0212
See application file for complete search history.

(56) References Cited

U.S. PATENT DOCUMENTS 9,768,899 B2 *   9/2017  Zhang ................ H04J 14/0204
2014/0308036 A1  10/2014  Aida
(Continued)

FOREIGN PATENT DOCUMENTS

| CN | 107431536 A | 12/2017 |
| EP | 2753011 A1 | 7/2014 |

(Continued)

OTHER PUBLICATIONS

International Search Report for PCT Application No. PCT/JP2020/022172, dated Jul. 28, 2020.
(Continued)

*Primary Examiner* — John Bedtelyon
(74) *Attorney, Agent, or Firm* — Sughrue Mion, PLLC

(57) ABSTRACT

Provided are a junction device and an undersea cable system capable of saving a branch line when a problem involving ground fault occurs in a power feed line on a branch station side. This junction device is inserted into a power feed line and a transmission line connecting first and second trunk stations and a branch station, and includes a switching means for controlling a switch so as to connect the transmission line between the branch station and the first or second trunk station when a current detection means detects that there is no longer current flowing through the power feed line between a junction unit and the branch station and when a first optical signal detection means detects an optical signal in the transmission line connecting the junction unit and the branch station.

14 Claims, 9 Drawing Sheets

(56) References Cited

U.S. PATENT DOCUMENTS

| | | |
|---|---|---|
| 2015/0349679 A1 | 12/2015 | Satou |
| 2016/0149663 A1 | 5/2016 | Ji et al. |
| 2017/0331516 A1 | 11/2017 | Yamaguchi |
| 2018/0054271 A1 | 2/2018 | Abe |
| 2018/0145785 A1 | 5/2018 | Aida |

FOREIGN PATENT DOCUMENTS

| | | |
|---|---|---|
| EP | 3232578 A1 | 10/2017 |
| EP | 3273625 A1 | 1/2018 |
| WO | 2013/094266 A1 | 6/2013 |
| WO | 2014/106575 A1 | 7/2014 |
| WO | 2014/115517 A1 | 7/2014 |
| WO | 2016/147610 A1 | 9/2016 |
| WO | 2016/181642 A1 | 11/2016 |

OTHER PUBLICATIONS

English translation of Written opinion for PCT Application No. PCT/JP2020/022172, dated Jul. 28, 2020.
Extended European Search Report for EP Application No. 20831963.2, dated Jul. 29, 2022.
CN Office Action for CN Application No. 202080035682.3, mailed on Dec. 29, 2023 with English Translation.

\* cited by examiner

JUNCTION DEVICE, AND UNDERSEA CABLE SYSTEM

This application is a National Stage Entry of PCT/JP2020/022172 filed on Jun. 4, 2020, which claims priority from Japanese Patent Application 2019-116239 filed on Jun. 24, 2019, the contents of all of which are incorporated herein by reference, in their entirety.

TECHNICAL FIELD

The present invention relates to a branching device, and a submarine cable system, and particularly relates to control of a branching device inserted into a transmission path and a power supply path connecting a plurality of trunk stations and a branch station.

BACKGROUND ART

An optical submarine cable system includes a terminal station A, a terminal station B, and a terminal station C provided on the land. The terminal station A and the terminal station B provided to face each other are connected by an optical submarine cable. The terminal station A and the terminal station B are terminal stations terminating the optical submarine cable. The terminal station A and the terminal station B are referred to as trunk stations. A submarine optical branching device (BU) is inserted midway of the optical submarine cable between the terminal station A and the terminal station B. The submarine optical branching device (BU) is placed on the seabed. The terminal station C is referred to as a branch station.

In the optical submarine cable system, it is often the case that a configuration of connecting a submarine optical branching device (BU) and a reconfigurable optical add/drop multiplexer (ROADM) device is employed as a device for branching a part of a wavelength-multiplexed optical signal on a branch station side. Since the submarine optical branching device (BU) and the ROADM device cannot be integrally configured due to constraints on a size of a casing of submarine equipment, a configuration may be employed in which an ROADM device connected to the vicinity of a submarine optical branching device (BU) via a submarine cable is disposed. It is possible to dynamically change a path route of a network by the ROADM device. As an optical device for achieving the ROADM device, a wavelength selective switch (WSS) is known. A part of a wavelength multiplexed optical signal is dropped by the wavelength selective switch, and a new optical signal to be transmitted to an opposing station is added, as the ROADM device.

Patent Literature 1 (PTL1) relates to an optical network system including a branching device, and proposes control of switching a power supply path according to a control signal received from a terminal station device. Patent Literature 2 (PTL2) relates to a submarine cable system including a branching device, and proposes a submarine cable system capable of maximally continuing an existing function by utilizing a facility in which a fault has not occurred, even when a fault occurs in a submarine cable and the like.

CITATION LIST

Patent Literature

[PTL1] International Publication No. WO2013/094266
[PTL2] International Publication No. WO2016/181642

SUMMARY OF INVENTION

Technical Problem

FIGS. 8A and 8B are a block diagram for describing a configuration of a branching device for use in the submarine cable system of the background art. The branching device for use in the submarine cable system of the background art includes a branching unit (BU) constituted of an optical switch circuit, and an ROADM unit provided with an ROADM function such as a WSS. The branching unit (BU) of the branching device includes a portion of an optical circuit configuration and a portion of an electric circuit configuration, and the ROADM unit of the branching device also includes a portion of the optical circuit configuration and a portion of the electric circuit configuration. For convenience of description, the portion of the optical circuit configuration and the portion of the electric circuit configuration in the branching unit (BU) of the branching device are respectively referred to as a branching unit 101-1 (BU 101-1) and a branching unit 101-2 (BU 101-2). For convenience of description, the portion of the optical circuit configuration and the portion of the electric circuit configuration in the ROADM unit of the branching device are respectively referred to as an ROADM unit 105-1 and an ROADM unit 105-2.

The branching unit 101-1 (BU 101-1) includes optical switches 102a to 102d (optical SWs 102a to 102d) inserted into an optical fiber connecting terminal stations, and configured to change a connection route between the terminal stations by a control signal. The branching unit 101-2 (BU 101-2) includes an optical switch circuit 103 (optical SW circuit 103) for detecting current in a power supply path between the ROADM unit 105-2 and the sea earth.

In a normal state of the branching device in FIGS. 8A and 8B, the ROADM unit 105-2 is connected to the branch station side of the branching unit 101-2 (BU 101-2), and is operated by electric power supply from the branch station side of the branching unit 101-2 (BU 101-2). The optical switch circuit 103 (optical SW circuit 103) is provided on the branch station side of the branching unit 101-2 (BU 101-2), and has a control function of the optical switches 102a to 102d (optical SWs 102a to 102d) of the branching unit 101-1 (BU 101-1), and a detection function of electric power supply in a power supply path of the branching unit 101-2 (BU 101-2).

Herein, when electric power from the branch station side is applied to the branching unit of the branching device in FIGS. 8A and 8B, the optical switches 102a to 102d (optical SWs 102a to 102d) of the branching unit 101-1 (BU 101-1) become switchable by a command signal from a terminal station on the land.

At a time of a normal operation, as illustrated in FIGS. 8A and 8B, the optical switches 102a to 102d (optical SWs 102a to 102d) within the branching unit 101-1 (BU 101-1) are connected to a contact point on the branch station side, and an optical signal on a trunk station side is added to or dropped from the branch station side.

A case where a ground fault has occurred in the branching device in FIGS. 8A and 8B is described with reference to FIGS. 9A and 9B. FIGS. 9A and 9B illustrate a case where a ground fault has occurred in a power supply path on the branch station side of the branching device in FIGS. 8A and 8B. In particular, FIGS. 9A and 9B illustrate a case where a ground fault has occurred in a power supply path between a branch station and an ROADM unit of the branching device, in the branching device in FIGS. 8A and 8B. Herein, it is assumed that a ground fault has occurred in a power supply path between the branch station and the ROADM unit of the branching device, but an optical fiber is not disconnected.

In a case where a ground fault has occurred in a power supply path between the branch station and the ROADM unit 105-2 of the branching device, electric power from the branch station does not reach the ROADM unit 105-2, and the branching device becomes a state that electric power to the ROADM unit 105-2 is not applied. Consequently, the branching device becomes a state in which electric power to the branch station side of the branching unit 101-2 (BU 101-2) is also not applied.

In this state, the ROADM unit 105-2 becomes inoperable due to no supply of electric power, and it is presumed that all the trunk stations and the branch station are disconnected in a state that the optical switches 102a to 102d (optical SWs 102a to 102d) of the branching unit 101-1 (BU 101-1) are switched to the branch station side. However, herein, the optical switch circuit 103 (optical SW circuit 103) provided on the branch station side of the branching unit 101-2 (BU 101-2) detects that there is no electric power supply from the branch station, and a connection state of the optical switches 102a to 102d (optical SWs 102a to 102d) of the branching unit 101-1 (BU 101-1) is initialized. By the initialization of the connection state of the optical switches 102a to 102d (optical SWs 102a to 102d), as illustrated in FIGS. 9A and 9B, the optical switches 102a to 102d (optical SWs 102a to 102d) are switched to the trunk station side. In this way, it is possible to configure the branching device in such a way that an optical signal of a trunk station does not undergo line disconnection, even when a ground fault occurs on the branch station side of the branching device.

Next, occurrence of another ground fault is described in association with the problem to be solved by the present invention.

FIG. 10 illustrates a case where a ground fault has occurred in a power supply path on the branch station side of the branching device in FIGS. 8A and 8B. Herein, unlike FIGS. 9A and 9B, FIG. 10 illustrates a case where a ground fault has occurred in a power supply path between the branching unit 101-2 (BU 101-2) and the ROADM unit 105-2. When a ground fault has occurred in a power supply path between the branching unit 101-2 (BU 101-2) and the ROADM unit 105-2 as in this case, electric power supply from the branch station to the ROADM unit 105-2 is maintained, and electric power from the branch station is applied to the ROADM unit 105-2. Therefore, the ROADM unit 105-2 is operable, and a branch line of the branch station is not disconnected.

However, the optical switch circuit 103 (optical SW circuit 103) provided on the branch station side of the branching unit 101-2 (BU 101-2) detects that there is no electric power supply from the branch station, and initializes a connection state of the optical switches 102a to 102d (optical SWs 102a to 102d) of the branching unit 101-1 (BU 101-1). In this way, the optical switch circuit 103 (optical SW circuit 103) detects that there is no electric power supply from the branch station, and, as illustrated in FIG. 10, the optical switch circuit 103 (optical SW circuit 103) automatically switches to the trunk station side.

The optical switch circuit 103 (optical SW circuit 103) is provided on the branch station side of the branching unit 101-2 (BU 101-2), and thus detects that there is no electric power supply from the branch station side. Therefore, until power supply on the branch station side of the branching unit 101-2 (BU 101-2) is recovered, it is not possible to switch to the branch station side by controlling the optical switch circuit 103 (optical SW circuit 103). Therefore, in a case where a ground fault has occurred in a power supply path between the branching unit 101-2 (BU 101-2) and the ROADM unit 105-2, as illustrated in FIG. 10, there is a problem that it is not possible to save a branch line until power supply on the branch station side of the branching unit 101-2 (BU 101-2) is recovered.

There is a voltage difference equal to or more than several kilo voltages between a power supply path of a trunk station, and a power supply path of a branch station in a branching device (BU), and it is technically difficult to provide, in a power supply path on the trunk station side, a detection circuit for branch power supply as exemplified by the optical switch circuit 103 (optical SW circuit 103) in FIGS. 8A, 8B to 10.

An object of the present invention is to provide a branching device, and a submarine cable system that are capable of saving a branch line when a ground fault occurs in a power supply path on a branch station side.

Solution to Problem

In order to achieve the above-described object, a branching device according to the present invention is a branching device inserted into a transmission path and a power supply path connecting a first trunk station and a second trunk station, the branching device including:

a branching unit that is connected to a branch station by a transmission path and a power supply path, and switches a route by controlling a switch inserted into the transmission path and the power supply path; and a reconfigurable optical add/drop multiplexer (ROADM) device that is inserted into a transmission path and a power supply path connecting the branch station and the branching unit, and supplies, to the branching unit, a control signal for controlling the switch of the branching unit.

The branching device further includes a current detection means for detecting that there is no current flowing through a power supply path between the branch station and the branching unit, a first optical signal detection means for detecting an optical signal in a transmission path connecting the branch station and the branching unit, and a switching means for controlling the switch in such a way as to connect a transmission path between either of the first trunk station and the second trunk station, and the branch station, when the current detection means detects that there is no current flowing through a power supply path between the branch station and the branching unit, and the first optical signal detection means detects an optical signal in a transmission path connecting the branch station and the branching unit.

A submarine cable system according to the present invention includes:

the first trunk station and the second trunk station installed on the land;

a submarine cable connecting the first trunk station and the second trunk station;

the above-described branching device inserted midway of the submarine cable; and a branch station connected to the branching device, and installed on the land.

A control method of a branching device according to the present invention is a control method of a branching device inserted into a transmission path and a power supply path connecting a plurality of trunk stations and a branch station, the control method including:

detecting that there is no current flowing through a power supply path between the branch station and the branching device;

detecting an optical signal in a transmission path connecting the branch station and the branching device; and, when current flowing through a power supply path between the branch station and the branching device is detected, and an optical signal in a transmission path connecting the branch station and the branching device is detected, switching an optical switch on a route of a transmission path in such a way as to connect a transmission path between one of the plurality of trunk stations and the branch station.

Advantageous Effects of Invention

The present invention is able to provide a branching device, and a submarine cable system that are capable of saving a branch line when a ground fault occurs in a power supply path on a branch station side.

EXAMPLE EMBODIMENT

Preferred example embodiments according to the present invention are described in detail with reference to the drawings. In a branching device and a submarine cable system according to the preferred example embodiments of the present invention, it becomes possible to detect both of power supply from a branch station, and an optical signal from the branch station, and switch an optical switch of the branching device to an appropriate state according to a condition. It also becomes possible to achieve a branching device and a submarine cable system capable of controlling an optical switch solely by power supply from a branch station, or solely by power supply from a trunk station.

First Example Embodiment

Figure 1:
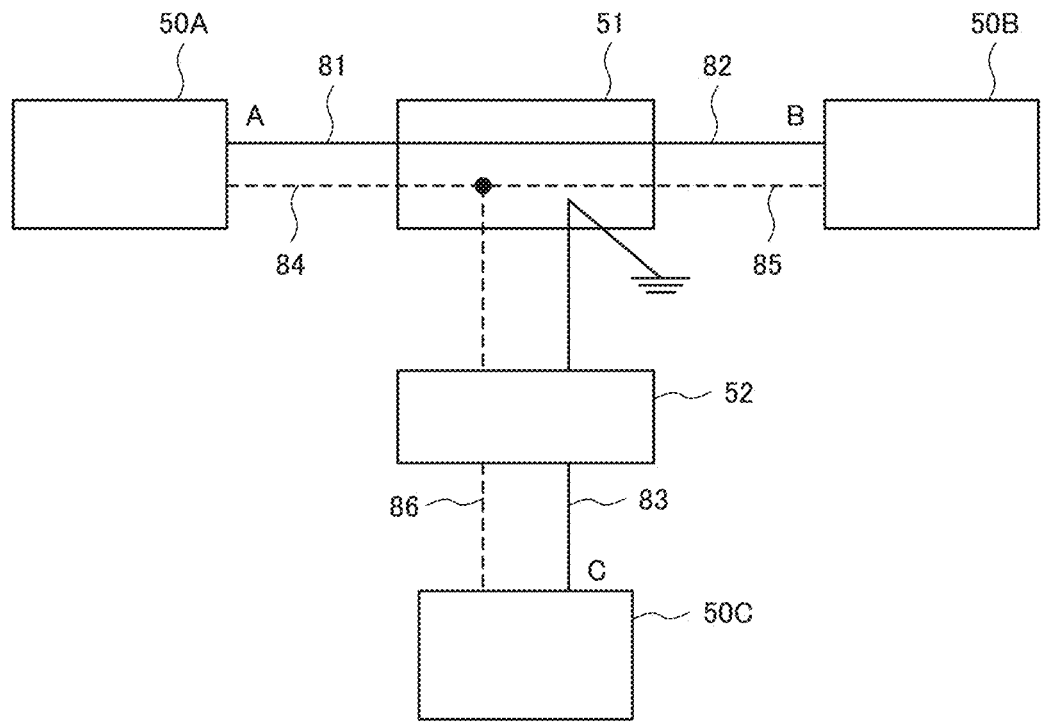
FIG. 1 is a configuration diagram for describing a submarine cable system according to a first example embodiment of the present invention.

A branching device and a submarine cable system according to a first example embodiment of the present invention are described. FIG. 1 is a configuration diagram for describing a submarine cable system according to the first example embodiment of the present invention. The submarine cable system in FIG. 1 includes a terminal station A (50A) as one example of a first trunk station installed on the land, a terminal station B (50B) as one example of a second trunk station, and a submarine cable connecting the terminal station A (50A) and the terminal station B (50B). The submarine cable system in FIG. 1 further includes a branching device inserted midway of the submarine cable, and a terminal station C (50C) as one example of a branch station connected to the branching device, and installed on the land. The submarine cable includes transmission paths 84 to 86 constituted of an optical fiber, and power supply paths 81 to 83. The power supply path 81 is provided along the transmission path 84, the power supply path 82 is provided along the transmission path 85, and the power supply path 83 is provided along the transmission path 86.

The branching device of the submarine cable system in FIG. 1 includes a branching unit 51 (BU 51) as a device for splitting a part of a wavelength-multiplexed optical signal on the terminal station C (50C) side, and a reconfigurable optical add/drop multiplexer (ROADM) unit 52. The branching unit 51 (BU 51) is a branching unit connected to the terminal station C (50C) as a branch station by the transmission path 86 and the power supply path 83. The branching unit 51 (BU 51) is constituted of an optical switch circuit, and switches a route by controlling a switch inserted into a transmission path and a power supply path reaching the terminal station A or the terminal station B. The ROADM unit 52 has an ROADM function such as a WSS. The ROADM unit 52 is inserted into the transmission path 86 and the power supply path 83 connecting the terminal station C (50C) as a branch station, and the branching unit 51 (BU 51), and supplies, to the branching unit 51 (BU 51), a control signal for controlling a switch of the branching unit 51 (BU 51).

Figure 2:
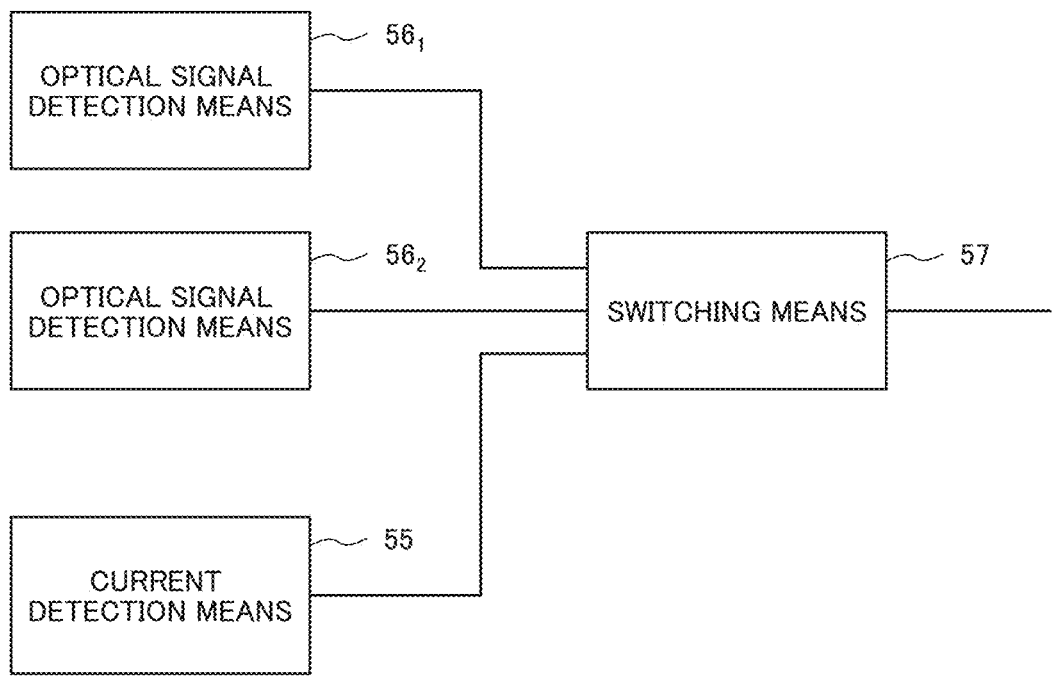
FIG. 2 is a configuration diagram for describing a branching device according to the first example embodiment of the present invention.

FIG. 2 is a configuration diagram for describing the branching device according to the first example embodiment of the present invention. In particular, the branching device in FIG. 2 is provided in the branching unit 51 (BU 51) in FIG. 1. The branching device in FIG. 2 includes a current detection means 55, an optical signal detection means $56_1$, an optical signal detection means $56_2$, and a switching means 57.

The current detection means 55 monitors current flowing through the power supply path 83 between the terminal station C (50C) as a branch station, and the branching unit 51 (BU 51), and detects that there is no current flowing through the power supply path 83. The current detection means 55 detects that there is no current flowing through the power supply path 83 by particularly monitoring current in a power supply path between the ROADM unit 52 and the sea earth among the power supply path 83 between the terminal station C (50C) and the branching unit 51 (BU 51). The optical signal detection means $56_1$ detects an optical signal in the transmission path 86 connecting the terminal station C (50C) as a branch station, and the branching unit 51 (BU 51). The optical signal detection means $56_2$ detects an optical signal in the transmission path 84 or the transmission path 85 connecting the terminal station A (50A) as one example of a first trunk station, and the terminal station B (50B) as one example of a second trunk station.

When the current detection means 55 detects that there is no current flowing through the power supply path 83 between the terminal station C (50C) and the branching unit 51 (BU 51), and the optical signal detection means $56_1$ detects an optical signal in the transmission path 86 connecting the terminal station C (50C) and the branching unit 51 (BU 51), the switching means 57 controls a switch of the branching unit 51 (BU 51) in such a way as to connect a transmission path between either of the terminal station A (50A) and the terminal station B (50B), and the terminal station C (50C). In particular, the switching means 57 performs control of a switch of the branching unit 51 (BU 51), which connects a transmission path between either of the terminal station A (50A) and the terminal station B (50B), and the terminal station C (50C), when the optical signal detection means $56_2$ detects an optical signal in the transmission path 84 or the transmission path 85 connecting the terminal station A (50A) and the terminal station B (50B).

Operation of Example Embodiment

Figure 8A:
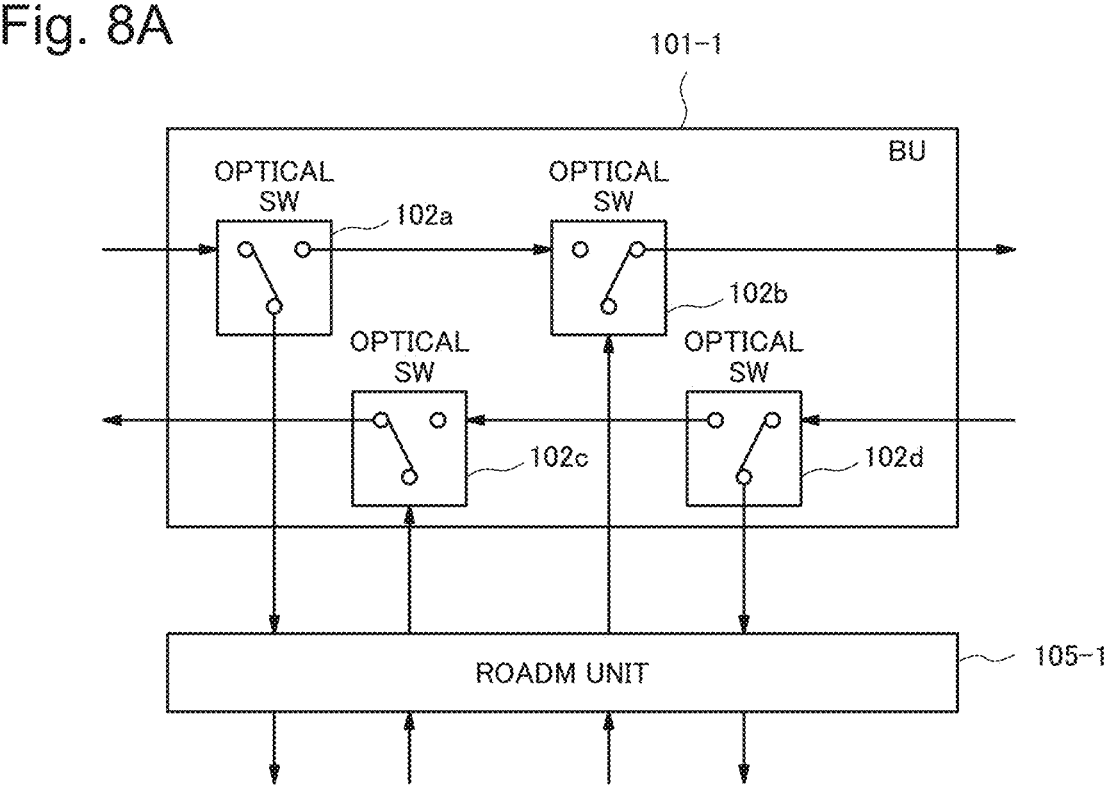
FIG. 8A is a block diagram for describing a configuration of a branching device for use in a submarine cable system of the background art.
Figure 8B:
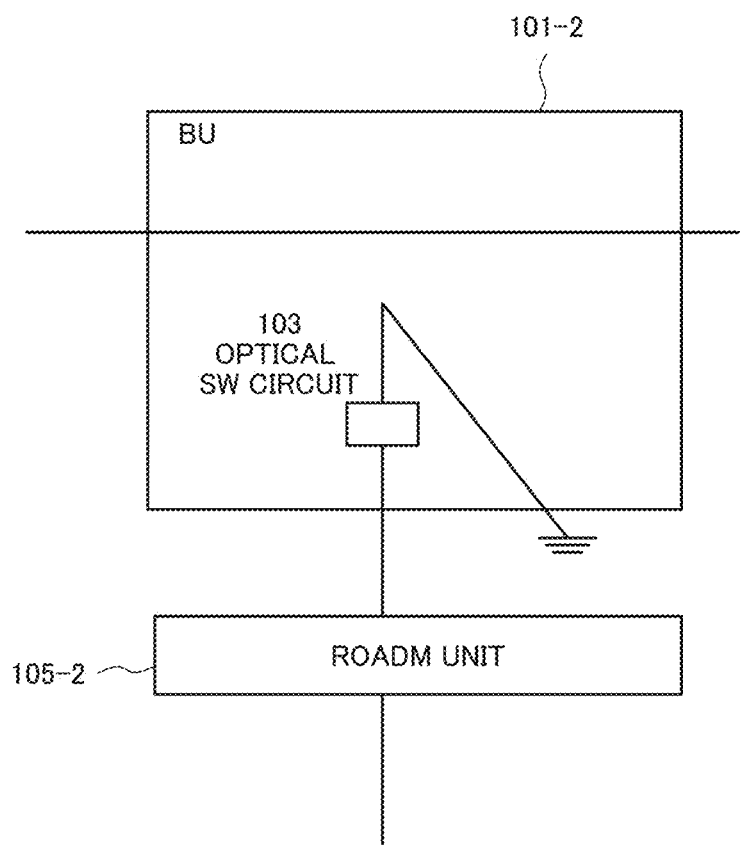
FIG. 8B is a block diagram for describing a configuration of a branching device for use in a submarine cable system of the background art.

Next, an operation of the branching device, and the submarine cable system according to the first example embodiment is described. For example, it is assumed that the branching device is in a normal state, as illustrated in FIGS. 8A and 8B that are referred to in the description of the background art. In this normal state, when electric power from the terminal station C (50C) as a branch station is applied to the branching unit 51 (BU 51) of the branching device in FIG. 2, the branching unit 51 (BU 51) becomes switchable by a command signal from a terminal station on the land. At a time of a normal operation, an optical signal on the trunk station side is added to or dropped from the branch station side by being connected to the branch station side within the branching unit 51 (BU 51).

The branching device according to the present example embodiment detects that there is no current flowing through the power supply path 83 by monitoring current flowing through the power supply path 83 between the terminal station C (50C) as a branch station, and the branching unit 51 (BU 51). The current detection means 55 detects that there is no current flowing through the power supply path 83 by particularly monitoring current in a power supply path between the ROADM unit 52 and the sea earth among the power supply path 83 between the terminal station C (50C) and the branching unit 51 (BU 51). The optical signal detection means $56_1$ detects an optical signal in the transmission path 86 connecting the terminal station C (50C) as a branch station, and the branching unit 51 (BU 51). The optical signal detection means $56_2$ detects an optical signal in the transmission path 84 or the transmission path 85 connecting the terminal station A (50A) as one example of a first trunk station, and the terminal station B (50B) as one example of a second trunk station. The switching means 57 controls a switch of the branching unit 51 (BU 51) in such a way as to connect a transmission path between either of the terminal station A (50A) and the terminal station B (50B), and the terminal station C (50C), when the current detection means 55 detects that there is no current flowing through the power supply path 83 between the terminal station C (50C) and the branching unit 51 (BU 51), and the optical signal detection means $56_1$ detects an optical signal in the transmission path 86 connecting the terminal station C (50C) and the branching unit 51 (BU51).

Advantageous Effect of Example Embodiment

For example, when a ground fault has occurred in a power supply path between the ROADM unit 52 and the sea earth, the current detection means 55 detects that there is no current flowing through the power supply path 83. The optical signal detection means $56_1$ detects an optical signal in the transmission path 86 connecting the terminal station C (50C) as a branch station, and the branching unit 51 (BU 51).

Then, the switching means 57 controls a switch of the branching unit 51 (BU 51) in such a way as to connect a transmission path between either of the terminal station A (50A) and the terminal station B (50B), and the terminal station C (50C), when the current detection means 55 detects that there is no current flowing through the power supply path 83 between the terminal station C (50C) and the branching unit 51 (BU 51), and the optical signal detection means $56_1$ detects an optical signal in the transmission path 86 connecting the terminal station C (50C) and the branching unit 51 (BU 51). Thus, even when a ground fault occurs in a power supply path between the ROADM unit 52 and the sea earth, the branching device can save a branch line. Thus, it is possible to save a branch line without waiting for recovery of power supply on the branch station side of the branching device.

Figure 9A:
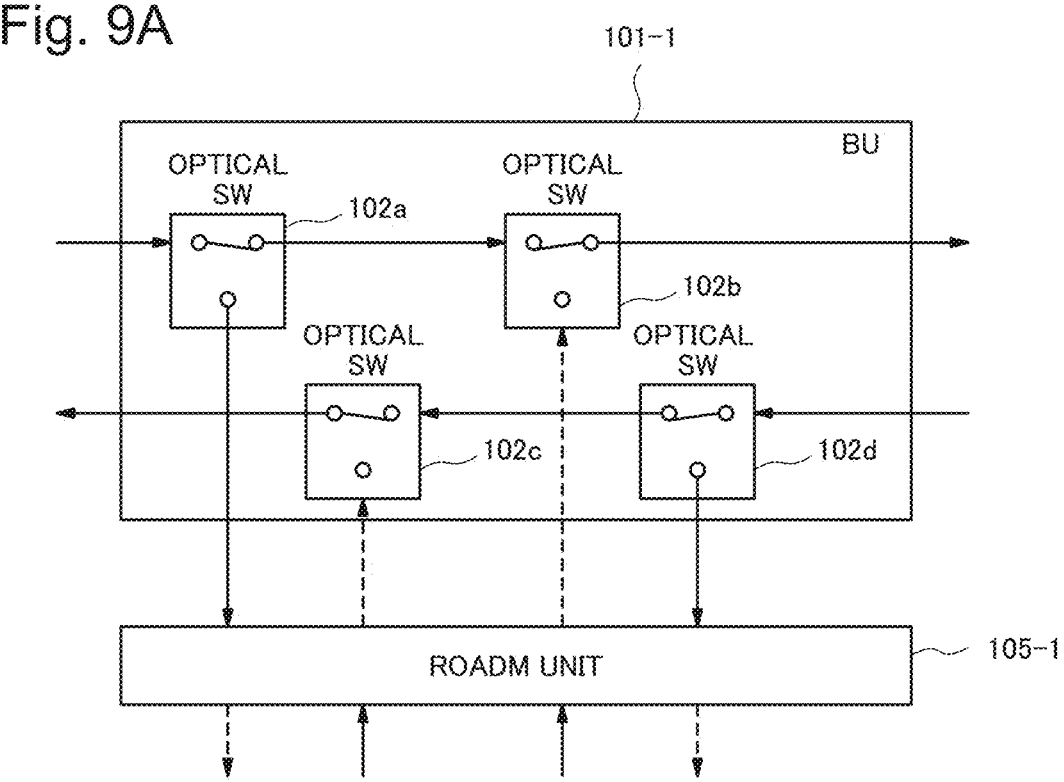
FIG. 9A is a block diagram for describing a switch switching operation of the branching device in FIGS. 8A and 8B, when a ground fault has occurred.
Figure 9B:
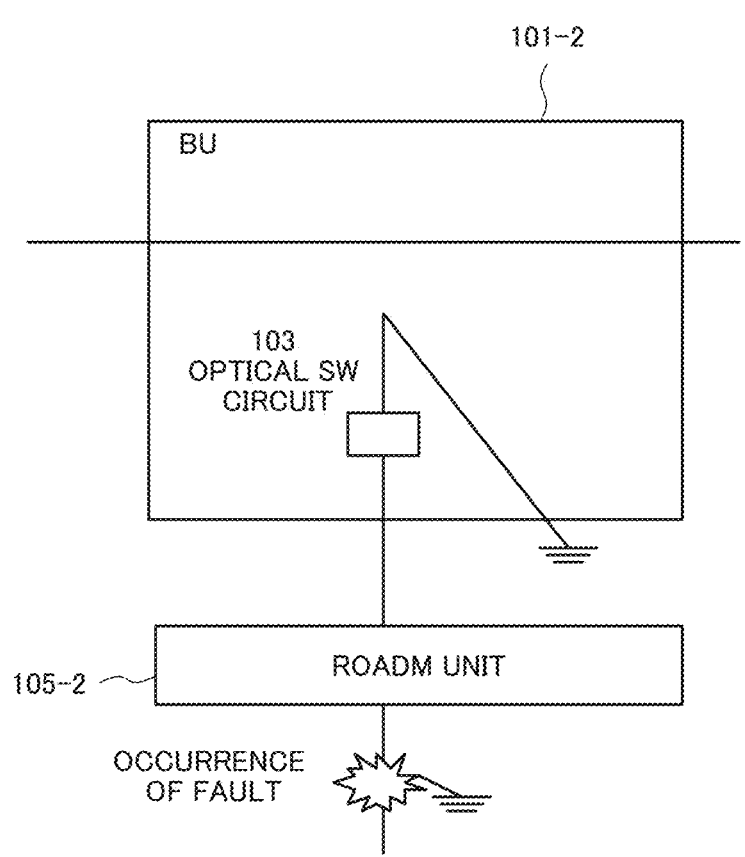
FIG. 9B is a block diagram for describing a switch switching operation of the branching device in FIGS. 8A and 8B, when a ground fault has occurred.

In the branching device according to the present example embodiment, even when a ground fault occurs in a power supply path between the terminal station C (50C) as a branch station, and the ROADM unit 52, which is described with reference to FIGS. 9A and 9B in the background art, the current detection means 55 detects that there is no current flowing through the power supply path 83. However, in this case, since electric power is not supplied to the ROADM unit 52, an optical signal is not detected in the transmission path 86 connecting the terminal station C (50C) and the branching unit 51 (BU 51). Therefore, similarly to the case described in the background art in FIGS. 9A and 9B, a switch of the branching device is initialized, and the switch is switched to the trunk station side. In this way, it is possible to configure the branching device in such a way that an optical signal of a trunk station does not undergo line disconnection even when a ground fault occurs on the branch station side of the branching device.

Second Example Embodiment

Figure 3:
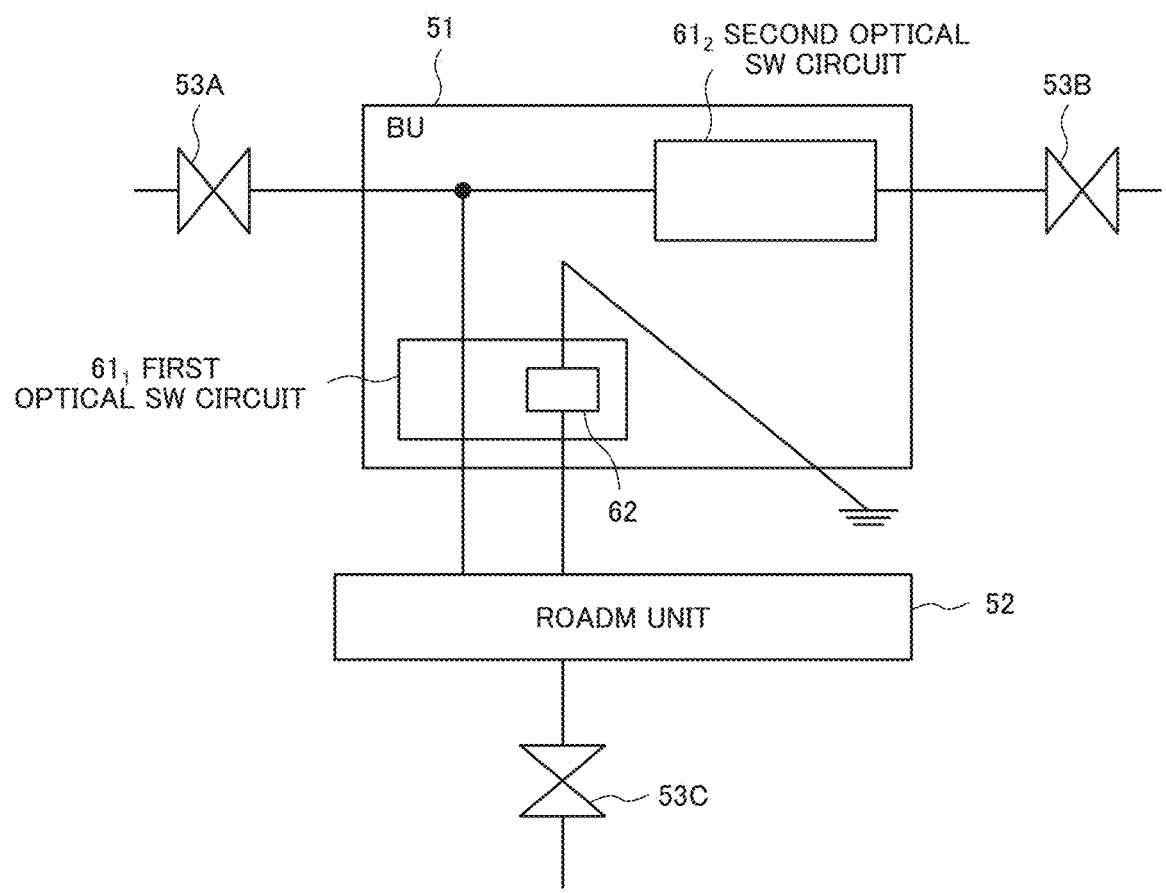
FIG. 3 is a configuration diagram for describing a submarine cable system according to a second example embodiment of the present invention.
Figure 4:
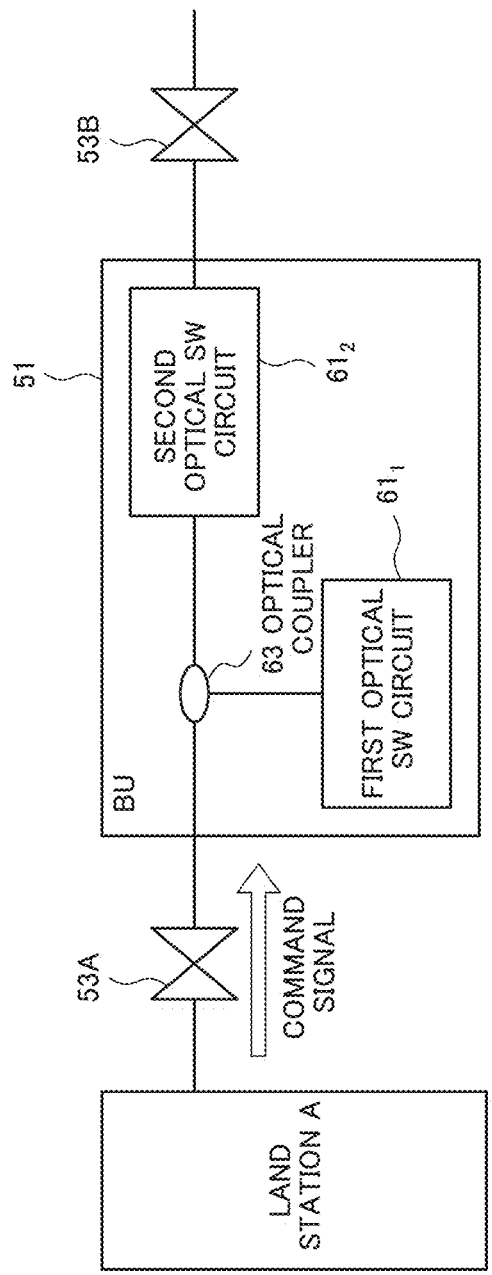
FIG. 4 is a configuration diagram for describing a switch switching operation of the submarine cable system in FIG. 3.
Figure 5A:
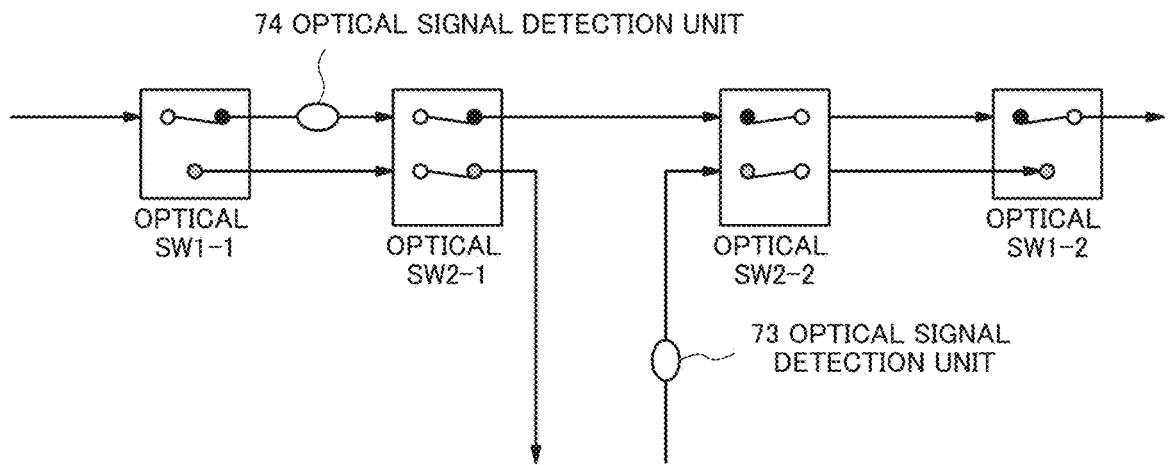
FIG. 5A is a configuration diagram for describing a configuration of an optical switch in a branching device according to the second example embodiment of the present invention.
Figure 5B:
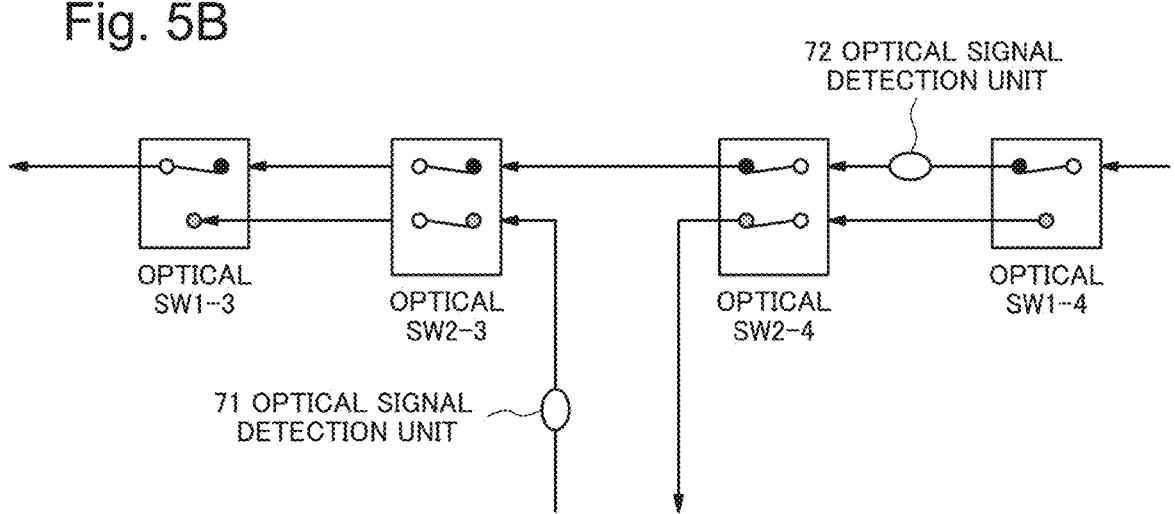
FIG. 5B is a configuration diagram for describing a configuration of an optical switch in a branching device according to the second example embodiment of the present invention.

Next, a branching device and a submarine cable system according to a second example embodiment of the present invention are described. The branching device and the submarine cable system according to the second example embodiment have a configuration in which the branching device according to the first example embodiment is further specified. Same reference numerals are appended to elements similar to those in the first example embodiment, and detailed description thereof is omitted. FIG. 3 is a configuration diagram for describing a configuration of a submarine cable system according to the present example embodiment. FIG. 4 is a configuration diagram for describing a switch switching operation of the submarine cable system in FIG. 3. FIGS. 5A and 5B are a configuration diagram for describing a configuration of an optical switch in the branching device according to the present example embodiment.

Configuration of Example Embodiment

As illustrated in FIG. 3, the branching device according to the second example embodiment includes an optical switch circuit 62 (optical SW circuit 62) as one example of a current detection means for detecting that there is no current flowing through a power supply path between a terminal station C as a branch station, and a branching unit 51. The branching device according to the second example embodiment further includes a first optical switch circuit $61_1$ (first optical SW circuit $61_1$) as one example of a first optical signal detection means for detecting an optical signal in a transmission path between the terminal station C as a branch station, and the branching unit 51. In the branching device according to the present example embodiment, the current detection means and the first optical signal detection means are integrated, and the optical switch circuit 62 (optical SW circuit 62) is incorporated within the first optical switch circuit $61_1$ (first optical SW circuit $61_1$). The branching device according to the second example embodiment further includes a second optical switch circuit $61_2$ (second optical SW circuit $61_2$) as one example of a second optical signal detection means for detecting an optical signal in a transmission path 84 or a transmission path 85 connecting a terminal station A (50A) as one example of a first trunk station, and a terminal station B (SOB) as one example of a second trunk station. A control command signal of an optical switch to be transmitted from a terminal station device in a land station building is divided by an optical coupler 63 in FIG. 4, and the divided signals are respectively transmitted to the first optical SW circuit $61_1$ and the second optical SW circuit $61_2$.

FIG. 3 illustrates a state in which a repeater 53A is inserted into a transmission path between the unillustrated terminal station A and the branching unit 51, a repeater 53B is inserted into a transmission path between the unillustrated terminal station B and the branching unit 51, and a repeater 53C is inserted into a transmission path between the unillustrated terminal station C and the branching unit 51. The repeater 53A, the repeater 53B, and the repeater 53C are operated by electric power supply from a power supply path provided along a transmission path, and amplify an optical signal in the transmission path.

An optical switch 1-1 (optical SW 1-1), an optical switch 1-2 (optical SW 1-2), an optical switch 1-3 (optical SW 1-3), and an optical switch 1-4 (optical SW 1-4) in FIGS. 5A and 5B are each a 1×2 type optical switch that switches to a trunk station side or a branch station side, and controlled by the first optical SW circuit $61_1$.

An optical switch 2-1 (optical SW 2-1), an optical switch 2-2 (optical SW 2-2), an optical switch 2-3 (optical SW 2-3), and an optical switch 2-4 (optical SW 2-4) in FIGS. 5A and 5B are each a 2×2 type optical switch that switches to the trunk station side or the branch station side, and controlled by the second optical SW circuit $61_2$.

Figure 5C:
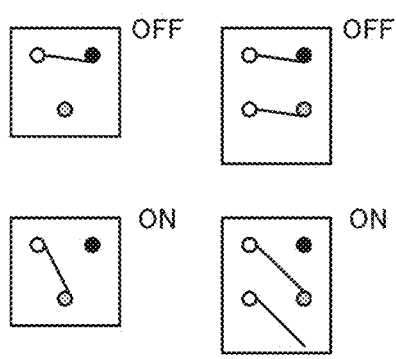
FIG. 5C is a configuration diagram for illustrating a 1×2 type optical switch switched between an ON-state and an OFF-state, and for illustrating a 2×2 type optical switch switched between an ON-state and an OFF-state.

As illustrated in FIG. 5C, a 1×2 type optical switch is switched between an ON-state and an OFF-state, and a 2×2 type optical switch is switched between an ON-state and an OFF-state. In an operation of an optical SW illustrated in FIG. 5C, when a 1×2 type optical switch and a 2×2 type optical switch are in an ON-state, a transmission path between one trunk station and a branch station is set to a connected state, and when the 1×2 type optical switch and the 2×2 type optical switch are in an OFF-state, a transmission path between one trunk station and another trunk station is set to a connected state.

When there is no power supply from the branch station side, the optical SW circuit 62 of the first optical SW circuit $61_1$ detects such state, and automatically sets the optical SW 1-1, the optical SW 1-2, the optical SW 1-3, and the optical SW 1-4 to an OFF-state.

The first optical SW circuit $61_1$ controls the optical SW 1-1, the optical SW 1-2, the optical SW 1-3, and the optical SW 1-4. As a control method of the first optical SW circuit $61_1$, there are two methods, namely, a method of setting the optical SWs 1-1 to 1-4 to an ON-state or an OFF-state by a control command signal from a land station, and a method of detecting current disconnection on the branch station side by the optical SW circuit 62 of the first optical SW circuit $61_1$, and automatically setting the optical SWs 1-1 to 1-4 to an OFF-state. The first optical SW circuit $61_1$ is operated by power supply from the branch station side of the branching device.

The second optical SW circuit $61_2$ controls the optical SW 2-1, the optical SW 2-2, the optical SW 2-3, and the optical SW 2-4. As a control method of the second optical SW circuit $61_2$, there are two methods, namely, a method of setting the optical SWs 2-1 to 2-4 to an ON-state or an OFF-state by a control command signal from a land station, and a method of detecting an optical signal on the trunk station side and an optical signal on the branch station side, and automatically setting the optical SWs 2-1 to 2-4 to an ON-state or an OFF-state. The second optical SW circuit $61_2$ is operated by power supply from the trunk station side of the branching device.

Operation of Example Embodiment

Next, an operation of the branching device according to the present example embodiment is described. FIG. 5A illustrates a configuration of a transmission path of an optical signal directing from the terminal station A to the terminal station B, and FIG. 5B illustrates a configuration of a transmission path of an optical signal directing from the terminal station B to the terminal station A. For convenience, a direction directing from the terminal station A to the terminal station B in FIGS. 5A and 5B may be referred to as "downstream", and a direction directing from the terminal station B to the terminal station A may be referred to as "upstream". A configuration of a downstream transmission path in FIGS. 5A and 5B, and a configuration of an upstream transmission path in FIGS. 5A and 5B are substantially the same.

Control and an operation of the downstream transmission path in FIGS. 5A and 5B are described. In the downstream transmission path in FIGS. 5A and 5B, the optical SW 1-1 and the optical SW 1-2 are controlled by the first optical SW circuit 611 in FIG. 3, and the optical SW 2-1 and the optical SW 2-2 are controlled by the second optical SW circuit $61_2$ in FIG. 3. When there is an optical signal from the branch station side, the first optical SW circuit 611 detects the optical signal. When there is an optical signal from the trunk station side, the second optical SW circuit 612 detects the optical signal.

Control and an operation of the upstream transmission path in FIGS. 5A and 5B are described. In the upstream transmission path in FIGS. 5A and 5B, the optical SW 1-3 and the optical SW 1-4 are controlled by the first optical SW circuit $61_1$ in FIG. 3, and the optical SW 2-3 and the optical SW 2-4 are controlled by the second optical SW circuit $61_2$ in FIG. 3. When there is an optical signal from the branch station side, the first optical SW circuit $61_1$ detects the optical signal. When there is an optical signal from the trunk station side, the second optical SW circuit $61_2$ detects the optical signal.

FIG. 4 is a configuration diagram for describing a switch switching operation of the submarine cable system in FIG. 3. In particular, FIG. 4 illustrates a block diagram of a power supply circuit of the branching unit 51 (BU 51). The first optical SW circuit $61_1$ is operated by power supply from the branch station side. It is possible to set the optical SW 1-1 and the optical SW 1-2 in the downstream transmission path of FIGS. 5A and 5B to an ON-state or an OFF-state, and set the optical SW 1-3 and the optical SW 1-4 in the upstream transmission path of FIGS. 5A and 5B to an ON-state or an OFF-state by a command control signal from a terminal station device in a land station building, for example, the land station A in FIG. 4. Herein, when there is no power supply from the branch station side, a function of the first optical SW circuit 611 of detecting branch power supply current is activated, and the control is switched to the trunk station side by automatically setting the optical SWs 1-1 to 1-4 to an OFF-state.

By power supply from the trunk station side, the second optical SW circuit $61_2$ is operated, and it is possible to set the optical SW 2-1 and the optical SW 2-2 in the downstream transmission path of FIG. 5 FIGS. 5A and 5B to an ON-state or an OFF-state, and set the optical SW 2-3 and the optical SW 2-4 in the upstream transmission path of FIGS. 5A and 5B to an ON-state or an OFF-state by a command control signal from a terminal station device in a land station building, for example, the land station A in FIG. 4. Herein, when there is no power supply from the branch station side, a function of the first optical SW circuit $61_1$ of detecting branch power supply current is activated, and the control is switched to the trunk station side by automatically setting the optical SWs 1-1 to 1-4 to an OFF-state.

An optical signal detection unit 71 has a function of detecting an optical signal input from a branch station, and particularly detects an optical signal in a transmission path directing from the terminal station C as a branch station to the terminal station A as a first trunk station. An optical signal detection unit 73 has a function of detecting an optical signal input from a branch station, and particularly detects an optical signal in a transmission path directing from the terminal station C as a branch station to the terminal station B as a second trunk station.

An optical signal detection unit 72 has a function of detecting an optical signal input from a trunk station, and particularly detects an optical signal in a transmission path directing from the terminal station A as a first trunk station to the terminal station B as a second trunk station. An optical signal detection unit 74 has a function of detecting an optical signal input from a trunk station, and particularly detects an optical signal in a transmission path directing from the terminal station B as a second trunk station to the terminal station A as a first trunk station.

Detection results of the optical signal detection unit 71, the optical signal detection unit 72, the optical signal detection unit 73, and the optical signal detection unit 74 are sent to the second optical SW circuit $61_2$, and the optical SW 2-1, the optical SW 2-2, the optical SW 2-3, and the optical SW 2-4 are controlled to an ON-state or an OFF-state. Herein, it is preferable to send, to the second optical SW circuit $61_2$ via an optical fiber by way of an optical signal, detection results of the optical signal detection unit 71, the optical signal detection unit 72, the optical signal detection unit 73, and the optical signal detection unit 74, taking into consideration a withstand voltage difference between a branch station and a trunk station.

As an example of control of the downstream transmission path in FIGS. 5A and 5B, when both of the optical signal detection unit 71 and the optical signal detection unit 72 detect that an optical signal is coming, the second optical SW circuit $61_2$ is operated, and the control is switched to the branch station side by automatically setting the optical SW 2-1 and the optical SW 2-2 to an ON-state. When a signal is not detected by either or both of the optical signal detection unit 71 and the optical signal detection unit 72, the optical SW 2-1 and the optical SW 2-2 are automatically set to an OFF-state. It is also possible to switch the optical SW 2-1 and the optical SW 2-2 to the ON side or the OFF-side by a command control signal from a terminal station device in a land station building.

As an example of control of the upstream transmission path in FIGS. 5A and 5B, when both of the optical signal detection unit 73 and the optical signal detection unit 74 detect that an optical signal is coming, the second optical SW circuit $61_2$ is operated, and the control is switched to the branch station side by automatically setting the optical SW 2-3 and the optical SW 2-4 to an ON-state. When a signal is not detected by either or both of the optical signal detection unit 73 and the optical signal detection unit 74, the optical SW 2-3 and the optical SW 2-4 are automatically set to an OFF-state. It is also possible to switch the optical SW 2-3 and the optical SW 2-4 to the ON side or the OFF-side by a command control signal from a terminal station device in a land station building.

At a time of a normal operation of the branching device and the submarine cable system, electric power from the trunk station side, and electric power from the branch station side are applied to the branching unit 51 (BU 51).

The first optical SW circuit $61_1$ is operable by current supply from the branch station side. By a control command signal from the land station A, the first optical SW circuit $61_1$ receives a command, and switches the optical SW 1-1, the optical SW 1-2, the optical SW 1-3, and the optical SW 1-4 to an ON-state. Thus, it becomes possible to communicate an optical signal between a trunk station and a branch station.

When a ground fault has occurred in a power supply path between the terminal station C (50C) as a branch station, and the ROADM unit 52, as described with reference to FIGS. 9A and 9B of the background art, electric power from the branch station does not reach the branch station side of the branching unit 51 (BU 51) and the ROADM unit 52. Thus, the ROADM unit 52 becomes inoperable, and a branch line is disconnected. However, the optical SW circuit 62 detects that there is no power supply from the branch station, and the first optical SW circuit 611 automatically switches the optical SW 1-1, the optical SW 1-2, the optical SW 1-3, and the optical SW 1-4 to an OFF-state. By this control, in a transmission path between trunk stations disconnection of a trunk line can be prevented without adding or dropping a signal to or from the branch station side.

Figure 10:
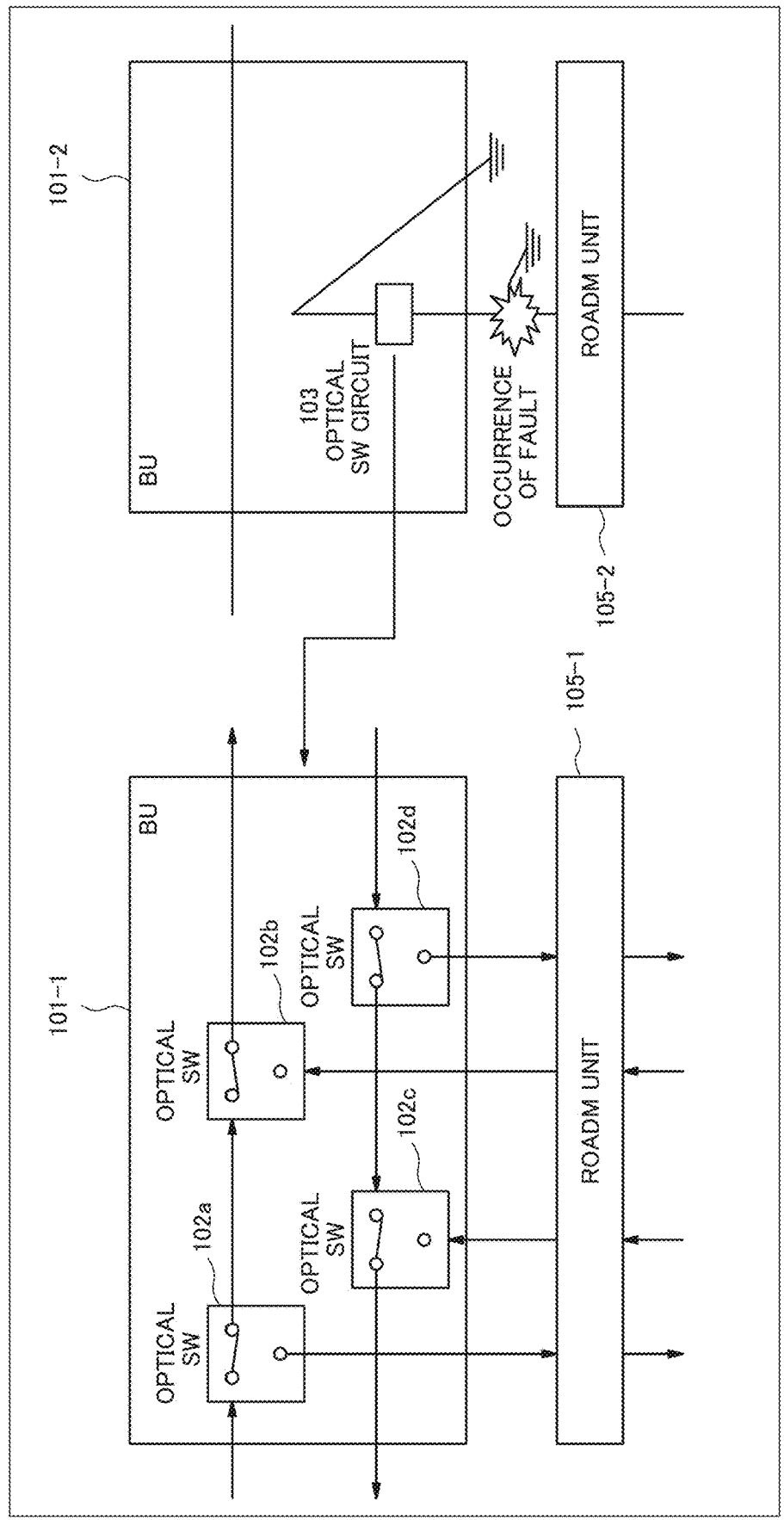
FIG. 10 is a block diagram for describing a problem involved in the branching device in FIGS. 8A and 8B, when a ground fault has occurred.

When a ground fault has occurred in a power supply path between the branching unit 51 (BU 51) of the branching device, and the ROADM unit 52, as described with reference to FIG. 10 of the background art, although electric power from a branch station reaches the ROADM unit 52, electric power from the branch station does not reach the branching unit 51 (BU 51) of the branching device.

Figure 7:
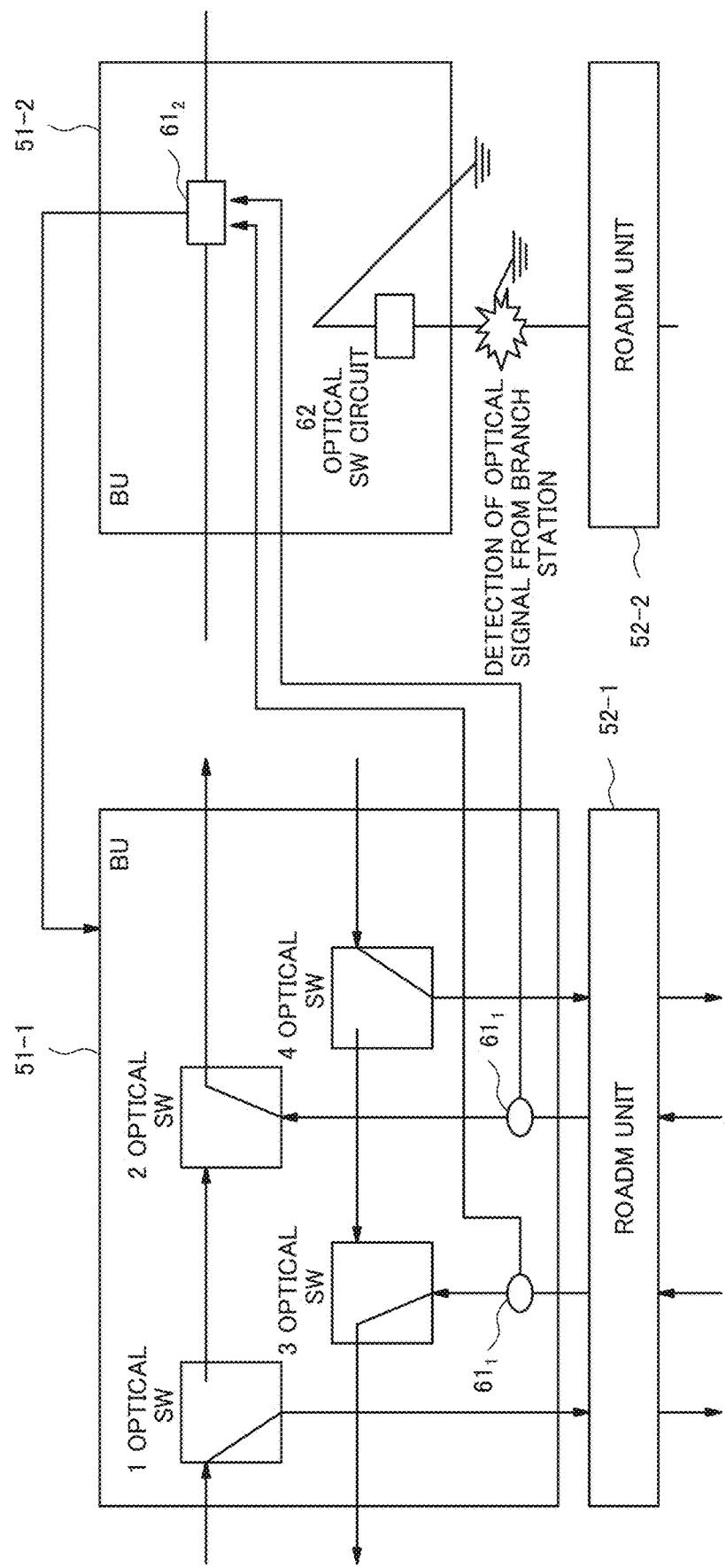
FIG. 7 is a block diagram for describing a switch switching operation of the branching device according to the second example embodiment of the present invention, when a ground fault has occurred.

Also in this case, the optical SW circuit 62 in FIG. 7 detects that there is no power supply from the branch station, and the first optical SW circuit 61$_1$ automatically switches the optical SW 1-1, the optical SW 1-2, the optical SW 1-3, and the optical SW 1-4 to an OFF-state. In this state, since electric power does not reach the branch station side, an optical switch of the branching unit 51 (BU 51) cannot be controlled even when a control command signal from the land station A is transmitted to the first optical SW circuit 61$_1$. However, in the example embodiments according to the present invention including the present example embodiment, recovery of a branch signal is enabled.

When a ground fault has occurred in a power supply path between the branching unit 51 (BU 51) of the branching device, and the ROADM unit 52, electric power from the branch station reaches the ROADM unit 52, and the ROADM unit 52 is operated. Therefore, an optical signal from the branch station side is input to the branching unit 51 (BU 51). An optical signal from the trunk station side is also input to the branching unit 51 (BU 51).

Figure 6:
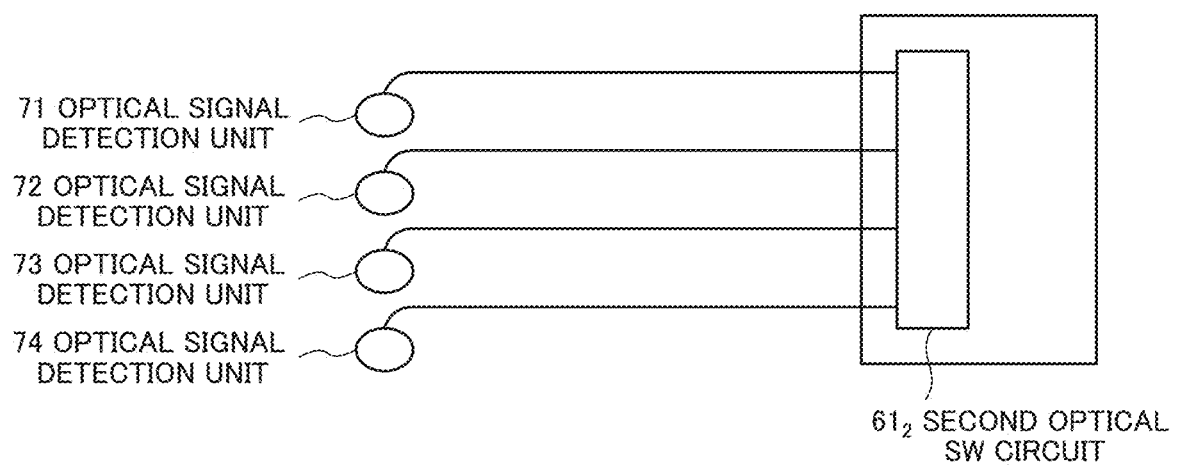
FIG. 6 is a configuration diagram for describing a configuration of the branching device according to the second example embodiment of the present invention.

In this case, the optical signal detection unit 71, the optical signal detection unit 72, the optical signal detection unit 73, and the optical signal detection unit 74 detect an optical signal from a trunk station and a branch station. As illustrated in FIG. 6, the optical signal detection unit 71, the optical signal detection unit 72, the optical signal detection unit 73, and the optical signal detection unit 74 detect an optical signal on the branch station side and the trunk station side, and the optical signals are transmitted to the second optical SW circuit 61$_2$. The optical signal detection unit 71, the optical signal detection unit 72, the optical signal detection unit 73, and the optical signal detection unit 74 convert the optical signal into an electrical signal by, for example, a photodiode or the like, thereby switching the optical switch.

When the optical signal detection unit 73 and the optical signal detection unit 74 detect an optical signal, the optical signal detection unit 73 and the optical signal detection unit 74 automatically switch the optical SW 2-1 and the optical SW 2-2 to an ON-state. When the optical signal detection unit 71 and the optical signal detection unit 72 detect an optical signal, the optical signal detection unit 71 and the optical signal detection unit 72 automatically switch the optical SW 2-3 and the optical SW 2-4 to an ON-state.

Advantageous Effect of Example Embodiment

Thus, even when a ground fault occurs in a power supply path between the branching unit 51 (BU 51) of the branching device, and the ROADM unit 52, it is possible to detect both of power supply from a branch station, and an optical signal from the branch station, and switch an optical switch of the branching device to an appropriate state according to a condition. In this way, even when a ground fault occurs in a power supply path between the branching unit 51 (BU 51) of the branching device, and the ROADM unit 52, recovery of a branch signal is enabled.

In the branching device according to the present example embodiment, even when power is not supplied from a branch station, it is possible to operate the second optical SW circuit 61$_2$ solely by power supply from a trunk station. By receiving a control command signal from a land station by the second optical SW circuit 61$_2$, and turning off or on the optical SW 2-1, the optical switch SW 2-2, the optical switch SW 2-3, and the optical SW 2-4, switching is enabled between a communication state solely on the trunk station side, and a communication state in which a signal is added to or dropped from the branch station side.

In the configuration of the background art, when a ground fault has occurred between a branching unit (BU) of a branch, and an ROADM unit, it is difficult to recover a branch signal, regardless of an operation of the ROADM unit. In contrast, the configuration of the above-described example embodiment enables recovery of a branch line by detecting an optical signal from a branch, even when electric power from the branch station side is not applied to the branching unit (BU).

Further, it becomes possible to switch an optical switch of the branching unit (BU) to the trunk station side or the branch station side by a remote control command signal from a terminal station device in a land station building, regardless of whether electric power from the branch station side is present. Thus, it is possible to save a branch line without waiting for recovery of power supply on the branch station side of the branching device, and it is possible to switch between a communication state solely on the trunk station side, and a communication state in which a signal is added to or dropped from the branch station side.

In the foregoing, preferred example embodiments according to the present invention have been described. However, the present invention is not limited to these. Various modifications can be made within the scope of the invention defined by the claims, and it is needless to say that these are also included in the scope of the present invention.

The whole or part of the example embodiments disclosed above can be described as, but not limited to, the following supplementary notes.

(Supplementary Note 1)

A branching device inserted into a transmission path and a power supply path connecting a first trunk station and a second trunk station, the branching device including:

a branching unit that is connected to a branch station by a transmission path and a power supply path, and switches a route by controlling a switch inserted into the transmission path and the power supply path; and a reconfigurable optical add/drop multiplexer (ROADM) device that is inserted into a transmission path and a power supply path connecting the branch station and the branching unit, and supplies, to the branching unit, a control signal for controlling the switch of the branching unit, wherein the branching device further includes a current detection means for detecting that there is no current flowing through a power supply path between the branch station and the branching unit, a first optical signal detection means for detecting an optical signal in a transmission path connecting the branch station and the branching unit, and a switching means for controlling the switch in such a way as to connect a transmission path between either of the first trunk station and the second trunk station, and the branch station, when the current detection means detects that there is no current flowing through a power supply path between the branch station and the branching unit, and the first optical signal detection means detects an optical signal in a transmission path connecting the branch station and the branching unit.

(Supplementary Note 2)

The branching device according to supplementary note 1, wherein the first optical signal detection means includes a first optical signal detection unit that detects an optical signal in a transmission path directing from the branch station to the first trunk station, and a second optical signal detection unit that detects an optical signal in a transmission path directing from the branch station to the second trunk station.

(Supplementary Note 3)

The branching device according to supplementary note 1 or 2, further including a second optical signal detection means for detecting an optical signal in a transmission path connecting the first trunk station and the second trunk station, wherein the second optical signal detection means includes a third optical signal detection unit that detects an optical signal in a transmission path directing from the first trunk station to the second trunk station, and a fourth optical signal detection unit that detects an optical signal in a transmission path directing from the second trunk station to the first trunk station.

(Supplementary Note 4)

The branching device according to supplementary note 2 or 3, wherein the switching means controls the switch in such a way as to connect a transmission path between the first trunk station and the branch station, when the current detection means detects that there is no current flowing through a power supply path between the branch station and the branching unit, and a first optical signal detection unit of the first optical signal detection means detects an optical signal in a transmission path directing from the branch station to the first trunk station.

(Supplementary Note 5)

The branching device according to supplementary note 3, wherein the switching means controls the switch in such a way as to connect a transmission path between the first trunk station and the branch station, when the current detection means detects that there is no current flowing through a power supply path between the branch station and the branching unit, a first optical signal detection unit of the first optical signal detection means detects an optical signal in a transmission path directing from the branch station to the first trunk station, and a fourth optical signal detection unit of the second optical signal detection means does not detect an optical signal in a transmission path directing from the second trunk station to the first trunk station.

(Supplementary Note 6)

The branching device according to supplementary note 2 or 3, wherein the switching means controls the switch in such a way as to connect a transmission path between the second trunk station and the branch station, when the current detection means detects that there is no current flowing through a power supply path between the branch station and the branching unit, and a second optical signal detection unit of the first optical signal detection means detects an optical signal in a transmission path directing from the branch station to the second trunk station.

(Supplementary Note 7)

The branching device according to supplementary note 3, wherein the switching means controls the switch in such a way as to connect a transmission path between the second trunk station and the branch station, when the current detection means detects that there is no current flowing through a power supply path between the branch station and the branching unit, a second optical signal detection unit of the first optical signal detection means detects an optical signal in a transmission path directing from the branch station to the second trunk station, and a third optical signal detection unit of the second optical signal detection means does not detect an optical signal in a transmission path directing from the first trunk station to the second trunk station.

(Supplementary Note 8)

The branching device according to any one of supplementary notes 1 to 7, wherein the current detection means and the first optical signal detection means are integrated.

(Supplementary Note 9)

A submarine cable system including:

the first trunk station and the second trunk station installed on land;

a submarine cable connecting the first trunk station and the second trunk station;

the branching device according to any one of supplementary notes 1 to 8, the branching device inserted midway of the submarine cable; and a branch station connected to the branching device, and installed on land.

(Supplementary Note 10)

A control method of a branching device inserted into a transmission path and a power supply path connecting a plurality of trunk stations and a branch station, the control method including:

detecting that there is no current flowing through a power supply path between the branch station and the branching device;

detecting an optical signal in a transmission path connecting the branch station and the branching device; and, when current flowing through a power supply path between the branch station and the branching device is detected, and an optical signal in a transmission path connecting the branch station and the branching device is detected, switching an optical switch on a route of a transmission path in such a way as to connect a transmission path between one of the plurality of trunk stations and the branch station.

(Supplementary Note 11)

The control method of the branching device according to supplementary note 10, further including, when it is detected that there is no current flowing through a power supply path between the branch station and the branching device, and an optical signal in a transmission path directing from the branch station to the first trunk station is detected, controlling an optical switch on a route of a transmission path in such a way as to connect a transmission path between the first trunk station and the branch station.

(Supplementary Note 12)

The control method of the branching device according to supplementary note 10, further including, when it is detected that there is no current flowing through a power supply path between the branch station and the branching device, an optical signal in a transmission path directing from the branch station to the first trunk station is detected, and an optical signal in a transmission path directing from the second trunk station to the first trunk station is not detected, controlling an optical switch on a route of a transmission path in such a way as to connect a transmission path between the first trunk station and the branch station.

(Supplementary Note 13)

The control method of the branching device according to supplementary note 10, further including, when it is detected that there is no current flowing through a power supply path between the branch station and the branching device, and an optical signal in a transmission path directing from the branch station to the second trunk station is detected, controlling an optical switch on a route of a transmission path in such a way as to connect a transmission path between the second trunk station and the branch station.

(Supplementary Note 14)

The control method of the branching device according to supplementary note 10, further including, when current flowing through a power supply path between the branch station and the branching device is detected, an optical signal in a transmission path directing from the branch station to the second trunk station is detected, and an optical signal in a transmission path directing from the first trunk station to the second trunk station is not detected, controlling an optical switch on a route of a transmission path in such a way as to connect a transmission path between the second trunk station and the branch station.

While the invention has been particularly shown and described with reference to example embodiments thereof, the invention is not limited to these example embodiments. It will be understood by those of ordinary skill in the art that various changes in form and details may be made therein without departing from the spirt and scope of the present invention as defined by the claims.

This application is based upon and claims the benefit of priority from Japanese patent application No. 2019-116239, filed on Jun. 24, 2019, the disclosure of which is incorporated herein in its entirety by reference.

REFERENCE SIGNS LIST

50A Terminal station A
50B Terminal station B
50C Terminal station C
51 Branching unit
52 ROADM unit
53A, 53B, 53C Repeater
55 Current detection means
$56_1$ Optical signal detection means
$56_2$ Optical signal detection means
57 Switching means
$61_1$ First optical switch circuit
$61_2$ Second optical switch circuit
62 Optical switch circuit
63 Optical coupler
71, 72, 73, 74 Optical signal detection unit
81, 82, 83 Power supply path
84, 85, 86 Transmission path

What is claimed is:

1. A branching device inserted into a transmission path and a power supply path connecting a first trunk station and a second trunk station, the branching device comprising:
a branching unit that is connected to a branch station by a transmission path and a power supply path, and switches a route by controlling a switch inserted into the transmission path and the power supply path; and
a reconfigurable optical add/drop multiplexer (ROADM) device that is inserted into a transmission path and a power supply path connecting the branch station and the branching unit, and supplies, to the branching unit, a control signal for controlling the switch of the branching unit, wherein
the branching device further comprises
a current detection unit for detecting that there is no current flowing through a power supply path between the branch station and the branching unit,
a first optical signal detection unit for detecting an optical signal in a transmission path connecting the branch station and the branching unit, and
a switching unit for controlling the switch in such a way as to connect a transmission path between either of the first trunk station and the second trunk station, and the branch station, when the current detection unit detects that there is no current flowing through a power supply path between the branch station and the branching unit, and the first optical signal detection unit detects an optical signal in a transmission path connecting the branch station and the branching unit.

2. The branching device according to claim 1, wherein the first optical signal detection unit includes a first optical signal detection unit that detects an optical signal in a transmission path directing from the branch station to the first trunk station, and a second optical signal detection unit that detects an optical signal in a transmission path directing from the branch station to the second trunk station.

3. The branching device according to claim 2, wherein the switching unit
controls the switch in such a way as to connect a transmission path between the first trunk station and the branch station, when the current detection unit detects that there is no current flowing through a power supply path between the branch station and the branching unit, and a first optical signal detection unit of the first optical signal detection unit detects an optical signal in a transmission path directing from the branch station to the first trunk station.

4. The branching device according to claim 2, wherein the switching unit
controls the switch in such a way as to connect a transmission path between the second trunk station and the branch station, when the current detection unit detects that there is no current flowing through a power supply path between the branch station and the branching unit, and a second optical signal detection unit of the first optical signal detection unit detects an optical signal in a transmission path directing from the branch station to the second trunk station.

5. The branching device according to claim 1, further comprising
a second optical signal detection unit for detecting an optical signal in a transmission path connecting the first trunk station and the second trunk station,
wherein
the second optical signal detection unit includes a third optical signal detection unit that detects an optical signal in a transmission path directing from the first trunk station to the second trunk station, and a fourth optical signal detection unit that detects an optical signal in a transmission path directing from the second trunk station to the first trunk station.

6. The branching device according to claim 3, wherein the switching unit controls the switch in such a way as to connect a transmission path between the first trunk station and the branch station, when the current detection unit detects that there is no current flowing through a power supply path between the branch station and the branching unit, a first optical signal detection unit of the first optical signal detection unit detects an optical signal in a transmission path directing from the branch station to the first trunk station, and a fourth optical signal detection unit of the second optical signal detection unit does not detect an optical signal in a transmission path directing from the second trunk station to the first trunk station.

7. The branching device according to claim 5, wherein the switching unit controls the switch in such a way as to connect a transmission path between the second trunk station and the branch station, when the current detection unit detects that there is no current flowing through a power supply path between the branch station and the branching unit, a second optical signal detection unit of the first optical signal detection unit detects an optical signal in a transmission path directing from the branch station to the second trunk station, and a third optical signal detection unit of the second optical signal detection unit does not detect an optical signal in a transmission path directing from the first trunk station to the second trunk station.

8. The branching device according to claim 1, wherein the current detection unit and the first optical signal detection unit are integrated.

9. A submarine cable system comprising:

the first trunk station and the second trunk station installed on land;

a submarine cable connecting the first trunk station and the second trunk station;

the branching device according to claim 1, the a branch station connected to the branching device, and installed on land.

10. A control method of a branching device inserted into a transmission path and a power supply path connecting a plurality of trunk stations and a branch station, the control method comprising:

detecting that there is no current flowing through a power supply path between the branch station and the branching device;

detecting an optical signal in a transmission path connecting the branch station and the branching device; and, when current flowing through a power supply path between the branch station and the branching device is detected, and an optical signal in a transmission path connecting the branch station and the branching device is detected, switching an optical switch on a route of a transmission path in such a way as to connect a transmission path between one of the plurality of trunk stations and the branch station.

11. The control method of the branching device according to claim 10, further comprising, when it is detected that there is no current flowing through a power supply path between the branch station and the branching device, and an optical signal in a transmission path directing from the branch station to the first trunk station is detected, controlling an optical switch on a route of a transmission path in such a way as to connect a transmission path between the first trunk station and the branch station.

12. The control method of the branching device according to claim 10, further comprising, when it is detected that there is no current flowing through a power supply path between the branch station and the branching device, an optical signal in a transmission path directing from the branch station to the first trunk station is detected, and an optical signal in a transmission path directing from the second trunk station to the first trunk station is not detected, controlling an optical switch on a route of a transmission path in such a way as to connect a transmission path between the first trunk station and the branch station.

13. The control method of the branching device according to claim 10, further comprising, when it is detected that there is no current flowing through a power supply path between the branch station and the branching device, and an optical signal in a transmission path directing from the branch station to the second trunk station is detected, controlling an optical switch on a route of a transmission path in such a way as to connect a transmission path between the second trunk station and the branch station.

14. The control method of the branching device according to claim 10, further comprising, when current flowing through a power supply path between the branch station and the branching device is detected, an optical signal in a transmission path directing from the branch station to the second trunk station is detected, and an optical signal in a transmission path directing from the first trunk station to the second trunk station is not detected, controlling an optical switch on a route of a transmission path in such a way as to connect a transmission path between the second trunk station and the branch station.

* * * * *